Dec. 30, 1941.  A. W. EVANS  2,267,904
SHAFT COUPLING
Filed Nov. 29, 1940

INVENTOR.
ADDISON W. EVANS
BY Robert H. Terry
ATTORNEY.

Patented Dec. 30, 1941

2,267,904

UNITED STATES PATENT OFFICE 2,267,904

SHAFT COUPLING

Addison W. Evans, Torrington, Conn., assignor to The Torrington Manufacturing Co., Torrington, Conn., a corporation of Connecticut Application November 29, 1940, Serial No. 367,708

8 Claims. (Cl. 64—15)

This invention relates to improvements in shaft couplings, and more particularly to an improved coupling assembly for rotatable shafts in apparatus wherein the coupling is adapted for transmission of relatively low torque, as in connection with fractional horsepower electric motors for a variety of drives, in oil burner assemblies and other similar installations. The principles of the invention are of course not restricted in any way to usage with equipment of the type noted.

The production of flexible couplings of the type and for the purposes noted has heretofore entailed a substantial amount of special machine work, some of which results in a high labor charge per coupling assembly. In still other designs, a great variety of stamping, forging or punching equipment has been required for production of the completed assembly.

An object of the present invention is accordingly attained in the production of a low cost, highly reliable coupling for substantially aligned rotatable shafts, in which one of the major coupling elements is or may be a low cost screw-machine product, and another of which may be quickly and readily formed at low cost for time and material, as by punch press or similar prevailing production equipment.

Yet another object of the invention is realized in an improved shaft coupling, which although formed entirely of metal elements, includes a torque transmitting fitting carried as a part of one of the shaft mounted assemblies, which possesses a certain limited although desirable flexibility, and is of such design as inherently to care for a reasonable degree of misalignment of the rotatable shafts connected through the couplings.

Yet another object of the invention, stated in connection with the production requirements of a coupling produced in accordance with the present improvements, is to reduce to a minimum, the machine operations on the shaft or rod stock of which the coupling hub elements are formed.

A still further object of the invention is attained in a coupling assembly formed of two major shaft-engaging elements, so formed that the shafts may each extend through its associated coupling member so as to obviate extreme niceties of axial placement of the coupling parts on the shafts to be connected.

Figure 1:
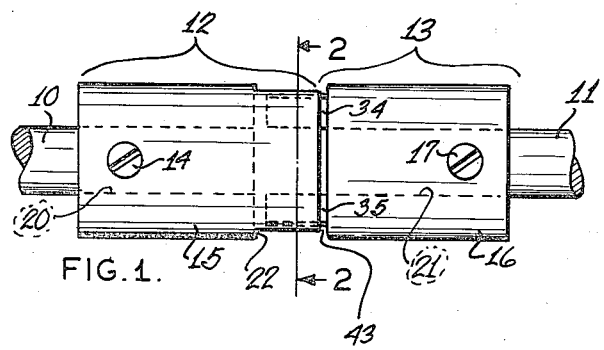
Figure 2:
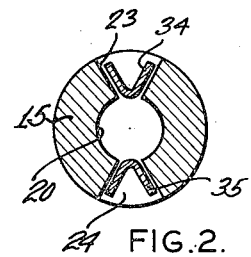
Figure 3:
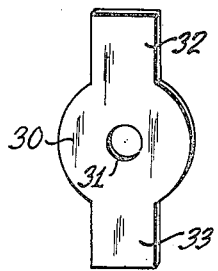
Figure 4:
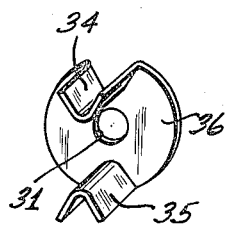
Figure 5:
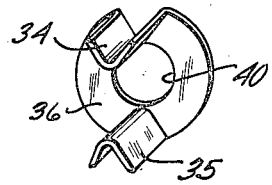
Figure 6:
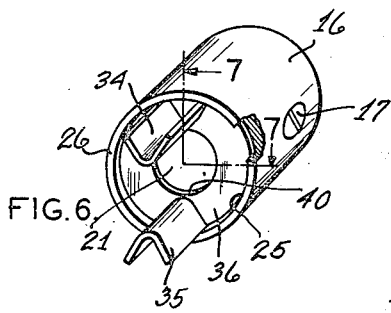
Figure 8:
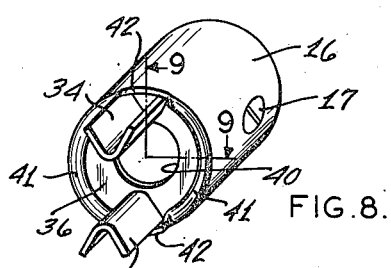
Figure 7:
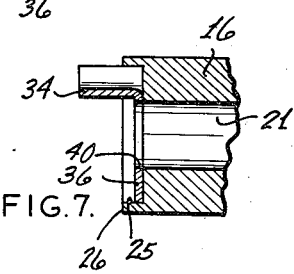
Figure 9:
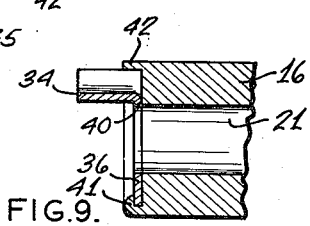
Figure 10:
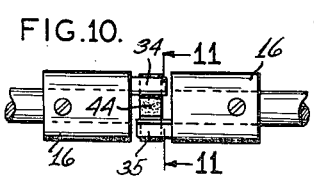
Figure 11:
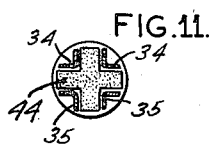

The foregoing and numerous other objects will appear from the following detailed description of a presently preferred embodiment of the invention, considered in connection with the accompanying drawing, in which:

Fig. 1 is a side elevation of a coupling assembly constructed to embody the present improvements, and showing fragmentary end portions of the shafts operatively connected through the coupling; Fig. 2 is a transverse sectional elevation of the assembly of Fig. 1 as viewed along line 2—2 thereof; Fig. 3 illustrates a sheet metal blank in an early stage of its formation, and which serves, after further forming, to constitute the male torque-transmitting portion of one of the halves of the coupling; Fig. 4 is a view of the torque-transmitting element of the coupling formed of the sheet metal blank as shown by Fig. 3; Fig. 5 is a view similar to Fig. 4, but showing the torque-transmitting element as provided with an enlarged central shaft-receiving opening; Fig. 6 is an end elevation in perspective, showing the element of Fig. 5 in a first stage of assembly to the hub of the male coupling member; Fig. 7 is a fragmentary sectional view along angular planes as indicated by line 7—7 of Fig. 6; Fig. 8 is an end elevation in perspective of the assembled male coupling member; Fig. 9 is a fragmentary sectional elevation along angularly related planes, as indicated by line 9—9 of Fig. 8; Fig. 10 is a side elevation of a slightly modified assembly, and Fig. 11 is a sectional view along line 11—11 of Fig. 10.

Referring now by characters of reference to the drawing, end portions of the substantially aligned shafts, are indicated respectively at 10 and 11. It will be understood that in usual practice, as in many of the prevailing types of oil burner assemblies, for example, the shafts 10 and 11 are spaced slightly from each other and are usually nearly in alignment, although in some cases slightly misaligned. Besides providing for a quick-detachable operative connection between the shafts 10 and 11, it will be understood from the structure hereinafter more fully described, that the interfitting torque-transmitting relation of the two major elements of the hub assembly is such as to care for a slight angular relation between the axes of the operatively connected shafts.

The coupling in preferred form includes a female coupling assembly 12 and a male coupling assembly 13, the coupling part 12 being provided with a radially tapped opening (not shown), serving to receive a setscrew 14 of any usual or suitable form, which secures the tub 15 to the shaft 10 in a manner to prevent its angular or axial displacement once the setscrew is taken up on the shaft 10. Similarly a hub element 16 of assembly 13, is provided with a radial tapped aperture (not shown) for the reception of setscrew 17, which bears a relation and serves a purpose identical to those described in a reference to setscrew 14. Each of the hub elements 15 and 16 is provided with an axial shaft-receiving bore, these being indicated respectively at 20 and 21, in the elements 15 and 16. Both of the hub elements 15 and 16 are by preference of a general cylindrical form. The end peripheral portion of the hub element 15 is slightly evenly undercut as shown at 22 (Fig. 1) and this undercut portion is provided with one or more, preferably a pair of longitudinal channels best appearing in Fig. 2 and indicated at 23 and 24. These serve, as will later appear, for the reception of the projecting arms or torque-transmitting elements of the male half of the coupling. By preference, the opposite walls of the channels 23 and 24, in the particular form of coupling shown, are divergently related to each other, so that the channels, recesses or pockets 23 and 24 are of somewhat triangular cross section as will best appear from Fig. 2. The particular section is however subject to variation without departure from the essentials of the present improvements.

The hub element 16 of the male half of the assembly is, in the form shown, of substantially regular cylindrical form and may be produced as a screw machine product as can also the hub element 15. The departure from true cylindrical form in the preferred construction, consists in the provision of a preferably circular recess in the end face of the hub adjacent the female coupling half. This recess, indicated at 25 (Fig. 6) may in other embodiments of the invention, be of other than circular shape, but is conveniently formed in this manner because of a relatively low cost of so doing. The diameter of the recess, pocket or socket 25 is such that there remains after forming the recess, as by counterboring or otherwise cutting, an annular rim, flange or projecting shoulder 26 serving a purpose later to be described, namely, in receiving for assembly purposes, a sheet metal torque-transmitting element such as shown by Fig. 5.

Proceeding now to a description of the torque-transmitting element carried by the male half of the assembly, there is preferably utilized for this purpose by reason of economy and effectiveness, a piece originally punched or otherwise cut of sheet metal, say sheet steel of a gauge selected according to the torque-transmitting requirement of the coupling. The blank, after the initial stage of shaping, is shown by Fig. 3 as characterized by a substantially circular central portion 30 axially or centrally apertured as at 31, and including a pair of diametrally projecting arm portions 32 and 33.

Preferably in a single press operation, the blank of Fig. 3 is formed in such manner as to bring the arms 32 and 33 to a substantially right angular relation to the center portion 30, and at the same or a subsequent operation, partially to fold the arms 32 and 33 to form thereof substantially channeled or V-shaped torque-transmitting projections or arms 34 resulting from shaping the arm 32, and 35, resulting from so shaping the arm 33 of the starting blank, the central body remaining substantially circular but for the now diametrally related indents, as shown at 36. In the same operation or set of operations as described in producing the formed element of Fig. 4, the sheet metal element is further provided with a sufficiently enlarged central aperture 40 (Fig. 5), preferably of a size to pass the end of one of the shafts, such as 11.

It will be understood that whether or not some of the operations are conducted concurrently with others, the several steps in producing the formed metal jaw and element consist in (a) blanking a piece of sheet in flat or planar shape, resulting in a blank of the general form shown by Fig. 3; (b) piercing the small opening such as 31, in the center of the blank, which provides for freedom in drawing the metal, and (c), forming to the approximate shape shown by Fig. 5. A final operation (d) consists in piercing the center opening 40 of such diameter as is sufficient to clear the shaft end, which might, under certain conditions, pass through the coupling half. It will be noted that the exact shape of the finished coupling prongs 34 and 35 may be considerably varied. These may of course if desired, be made suitable for the Bond or Lovejoy types of small jaw couplings.

It remains now to assemble the structure of Fig. 5, to the hub such as 16. It will have been observed that the outer diameter of the body 30 is substantially the same as the inside diameter of the annular flange resulting from the counterbored socket or recess 25 in the end of hub 16. It is preferred for economy that both the body 30 and the counterbore or recess 25 be of circular form. In case some other form is utilized, common to the portions 30 and 25, it is desirable that the body of the blank interfit, in snug relation, the recess on the coupling face of the hub by which it is carried.

The assembly operations include interfitting the element of Fig. 5 into the counterbore of hub 16, following which only certain portions of the remaining upstanding flange 26, are rolled, swaged or crimped down over the adjacent periphery of the body 30 of the sheet metal unit. The assembly thus far will then appear as shown by Fig. 8. It will be noted from Fig. 8, as a preference that the deformed or downturned flange, herein indicated at 41, extends from a point close to one of the arms such as 34, around to a zone contiguous to an inner margin of the opposite arm 35. By further preference, those portions of the upstanding flange, now indicated at 42, and which overlie the channels of the trough-like arms, are allowed to remain upstanding. The resulting difference in relation between the deformed flange portions 41 and those shown at 42, results in a distinct lateral embracing relation of the margins 41 about the arms 34 and 35 near their zones of junction with the body 30, thus providing a very sturdy and rigid gripping engagement between the hub and the sheet metal unit.

Following the rolling or other deforming operation resulting in the opposite flange portions 41 (Fig. 8), the male half of the coupling is fully assembled and ready to apply to the shaft end in the usual manner by sleeving the couplings over the shafts and establishing their respective final axial positions as through the setscrews 14 and 17. In assembly to the shafts, as will appear from Fig. 1, it is of course desirable to space the halves of the coupling slightly from each other, thus resulting in a sufficient clearance, indicated at 43, so that the coupling halves may, without abutment, have a slight relative rocking movement in case the shaft elements are slightly misaligned.

A slightly modified coupling assembly is shown by Figs. 10 and 11, wherein a pair of the male coupling assemblies are respectively carried by the shaft ends, each such male coupling part corresponding to that indicated at 13, and heretofore described. In this arrangement, a single female member or spider 44, receives and transmits torque between the arms of the assemblies 13. It will be seen that the arms of the cooperating male members are relatively angularly displaced approximately 90°. The spider 44 is desirably formed in cross shape of a non-metallic material, such as leather, compounded rubber or the like, or of fiber, exhibiting a desirable compressive resilience between the arms 34 and 35 of the companion coupling heads 13.

Although the invention has been described by making specific reference to a single preferred embodiment, it will be understood that numerous changes may be made in the parts themselves and their exact mode of assembly, all without departing from the full intended scope of the claims hereunto appended.

I claim as my invention:

1. A shaft coupling including male and female hub assemblies for respective securement to substantially aligned shafts, the male hub assembly including a hub element and a sheet metal power-transmitting element comprised of a transversely disposed sheet metal body disc and arms integral with, and projecting at about a right angle to the body disc, one of said elements being cut away over a portion of its sectional area to receive the other element in interfitted relation, with one of the elements characterized by a bead in embracing relation to the other element in a manner to prevent relative angular or axial displacement of the elements, and the female hub assembly being formed so as separably to receive said arms in interfitting torque-transmitting relation.

2. In a shaft coupling of the general type described, including a pair of hub assemblies for securement to spaced substantially aligned shafts, one of the hub assemblies including a sheet metal plate arranged transversely of the axis of the assembly and a hub element recessed to receive the plate, the plate and recessed hub portion being shaped to prevent their relative rotative displacement, and a pair of longitudinal arms consisting of integral angulate portions of the plate, the arms being of channel shape and projecting longitudinally from the plate and parallel to the axis of the associated hub element, the companion hub assembly being provided with recessed portions adapted to receive said arms in torque-transmitting relation.

3. The combination as recited in claim 2, further characterized in that the sheet metal plate, exclusive of its arms, and the hub recess to receive the plate, are of substantially circular shape, and in which the peripheral hub portion about the hub recess is in gripping engagement with the plate and related to the arms thereon in a manner to prevent relative rotative displacement of the plate and associated hub.

4. A shaft coupling assembly of the general type described including a first hub assembly and a second hub assembly, the first hub assembly including a hub having a socketed end face, a sheet metal coupling element having a substantially flat body arranged transversely of the coupling axis and interfitting said socketed portion, portions of the metal about said socket being turned inwardly toward the coupling axis into holding engagement with said sheet metal body, a pair of arms of channel section constituted by integral parts of the body and projecting therefrom longitudinally of the associated hub assembly, the second hub assembly being provided with recesses of a shape separably to receive and normally closely to engage said arms in torque-transmitting relation thereto.

5. In a coupling assembly of the general type described, a first hub assembly and a second hub assembly, said first assembly including a hub having a recessed end face, a sheet metal element including a body plate with a pair of driving arms projecting endwise of the hub in substantially parallel, diametrally opposed relation, the walls of the hub recess being folded over the edges of the plate only between said arms and being upstanding adjacent the arms, whereby the walls and arms coact in preventing relative angular displacement of the sheet metal element and the hub element by which it is carried, the second hub assembly being provided with longitudinal peripheral recesses to receive said arms in torque-transmitting relation in the assembly.

6. A shaft coupling including a first hub assembly and a second hub assembly, the first hub assembly including a hub element provided with a circularly recessed end face portion, a sheet metal torque-transmitting element characterized by a body portion of generally circular form and of a diameter snugly to interfit the circular recess, and a pair of arms of substantially L-shape transverse section projecting from diametrally opposite peripheral portions of the sheet metal body and within the recessed portion of the associated hub element, the sheet metal body and end face portion of the hub element of said first assembly being provided with openings to permit passage of a shaft therethrough, the walls of the end face of the hub element of said first hub assembly being deformed in a radially inward direction along those portions of the periphery of the sheet metal body between the arms thereof, and remaining upstanding along those portions adjacent and just outwardly of the arms, the second hub assembly being provided with recesses to receive and conform substantially to said arms whereby detachably to engage the arms in interfitting torque-transmitting relation.

7. In a coupling assembly of the general type described, a first hub assembly and a second hub assembly, said first assembly including a hub having a recessed end face, a sheet metal disc including a body plate disposed transversely of the coupling axis, with a plurality of integral driving arms projecting endwise of the hub, the arms being angularly spaced from each other about the coupling axis and being disposed generally parallel to each other and parallel to the coupling axis, the walls of the hub recesses being turned inwardly so as to overlie and embrace the edges of the plate between said arms and being upstanding adjacent the arms in such manner that the walls and arms coact in preventing relative angular and axial displacement of the sheet metal element and the hub element by which it is carried, the second hub assembly being provided with longitudinal peripheral recesses conforming generally in shape to said arms so as to receive the arms in torque-transmitting relation in the assembly.

8. A shaft coupling including a first hub assembly and a second hub assembly, the first hub assembly including a hub element provided with a recessed end face portion, a sheet metal torque-transmitting element characterized by a substantially flat, transverse plate portion of a form and size snugly to interfit said recessed portion, a plurality of arms of a channeled transverse section projecting from angularly spaced peripheral portions of the sheet metal element, the sheet metal element and end face portion of the hub element of said first assembly being provided with openings to permit passage of a shaft therethrough, the walls of the end faces of the hub element of said first hub assembly being deformed in a radially inward direction along those portions of the periphery of the sheet metal body between the arms thereof, and remaining upstanding along those portions adjacent and just outwardly of the arms, the second hub assembly being provided with recesses to receive and conform substantially to said arms whereby detachably to engage the arms in interfitting torque-transmitting relation.

ADDISON W. EVANS.